GATING CIRCUIT FOR HYBRID COMPUTER APPARATUS

Filed April 11, 1967

INVENTOR.
ELMER G. GILBERT

BY Richard G. Stephens

ATTORNEY

United States Patent Office 3,488,478
Patented Jan. 6, 1970

3,488,478

GATING CIRCUIT FOR HYBRID COMPUTER APPARATUS

Elmer G. Gilbert, Ann Arbor, Mich., assignor to Applied Dynamics, Inc., Ann Arbor, Mich., a corporation of Michigan Filed Apr. 11, 1967, Ser. No. 629,938
Int. Cl. G06j *1/00*
U.S. Cl. 235—150.5 10 Claims

ABSTRACT OF THE DISCLOSURE

A gating circuit for connecting analog comparator output logic signals to the patchboard of hybrid analog-digital computer apparatus having synchronous digital computer equipment enabled by a clock pulse source in such a manner as to decrease time lag due to buffering between the analog and digital devices.

Hybrid computer systems which include an electronic analog computer interconnected with an electronic digital computer are well known in the computation and simulation arts and widely used to solve complex problems, usually of a scientific nature. Basic descriptions of some such systems are contained in the article "Combined Use of Analog and Digital Computers" by Greenstein and Leger in "Computer Handbook" edited by Huskey and Korn (McGraw-Hill, New York, 1962), in "The Impact of Hybrid Analog-digital Techniques on the Analog Computer Art" by G. A. Korn, Proc. IRE, May 1962, and in "Electronic Analog and Hybrid Computers" by G. A. Korn (McGraw-Hill, New York, 1964). The analog computer ordinarily comprises a collection of electronic integrators, multipliers, function generators, coefficient-setting devices such as potentiometers, comparators and switches and a patchboard by means of which such devices may be interconnected to solve a desired specific set of equations. The digital computer ordinarily comprises an arithmetic unit, one or more memories in which data and instructions may be stored, and a control unit which causes instructions to be executed. The analog and digital computers are interconnected by conversion equipment, frequently called a "linkage," which includes one or more analog-to-digital converters for transmitting data from the analog computer to the digital computer, and digital-to-analog converter for transmitting data in the opposite direction from the digital computer to the analog computer. The present invention does not involve the manner in which *data* is transmitted from the analog computer to the digital computer, but rather the manner in which logic signals, such as those derived by an analog computer, are used to control a synchronous digital computer, and also used to control circuits other than the comparator in the analog computer.

A variety of hybrid analog-digital computer problems involve circuit arrangements in which the output signals from analog comparator circuits are intended to affect the computation procedures of both the interconnected digital computer and other circuits of the analog computer, and accordingly are made available at a computer patchboard for selective connection to appropriate circuits. For example, it is often desired that the mode of operation of the digital computer and the mode of operation of the analog computer be changed as soon as some analog quantity reaches zero or some other specified value, and it is common in analog computers to indicate the occurrence of such an event by arranging an analog comparator to switch upon the occurrence of the event. A problem solution time on the analog computer might be of the order of several seconds, and the precise instant during such time that the event will occur (and often even whether the event will occur at all) are ordinarily unknown, since it depends upon the data being manipulated. In many applications it is either necessary or desirable, for reliability of operation and ease of programming, that the digital computer be a synchronous one rather than a non-synchronous one, so that all digital computer operations proceed on a fixed and predetermined time schedule in synchronism with the clock or timing pulses of the synchronous digital computer. For example, successive operations in the synchronous digital computer might proceed every successive microsecond, irrespective of the numerical values of the data being manipulated. While the successive operations of the digital computer advance at the fixed clock rate, to be accomplished during the occurrence of fixed clock pulses, it will be recognized that the analog computer comparator outputs in such an arrangement are likely to occur at any time, as likely as not inbetween clock pulse periods as during clock pulse periods.

In the prior art, the usual way way of introducing analog comparator logic signal outputs into the synchronous digital computer in order to control the mode of operation of the computer has been to apply a comparator output to a synchronous flip-flop or like device, which device is controlled as well by an enabling clock pulse, so that the flip-flop, even though supplied with the analog comparator output pulse long before a clock pulse, does not change state (and accordingly does not affect the digital or analog computers) until the next succeeding clock pulse occurs, and usually not until the trailing edge of the next clock pulse occurs. It may be seen in such an arrangement that switching of the flip-flop is undesirably delayed, so that operation of any analog device controlled by the flip-flop is also delayed. Such artificially caused delays can cause appreciable errors in hybrid computer solutions.

In the invention, rather than being rendered ineffective until occurrence of the next succeeding clock pulse analog, comparator output signals are supplied to the patchboard to be connected to succeeding digital and analog devices through a gating circuit, to change state and provide switching signals immediately upon the occurrence of a change in the comparator output state during any time inbetween clock pulses, but not to change state or provide an output signal solely during the period of occurrence of any clock pulse. It is necessary in any synchronous digital system that some time period be provided during which switching not be able to occur in order to provide settling time for the various signals whose eventual states dictate whether or not switching should occur. If the time periods between successive clock pulses are greater than the periods of the clock pulses themselves, as is ordinarily the case, it may become apparent, and can be proved statistically, that with the system of the invention, less average delay will result in the operation of associated analog devices, so that more accurate computation or simulation will result. Otherwise expressed, less computational error will result if analog comparator output signals are made inoperative to control the computer only during the relatively brief occurrence of clock pulses rather than rendering them inoperative during the relatively long periods which occur inbetween successive clock pulses. In accordance with contemporary computer terminology, the comparator of the present invention may be said to be connected to the computer elements required to be controlled by the comparator through a clocked flip-flop capable of jam transfer.

Thus it is a primary object of the present invention to provide an improved system for interconnecting between analog and synchronous digital computers, and a more specific object to provide an improved system for applying the output of an analog comparator to a hybrid analog-digital computer system.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
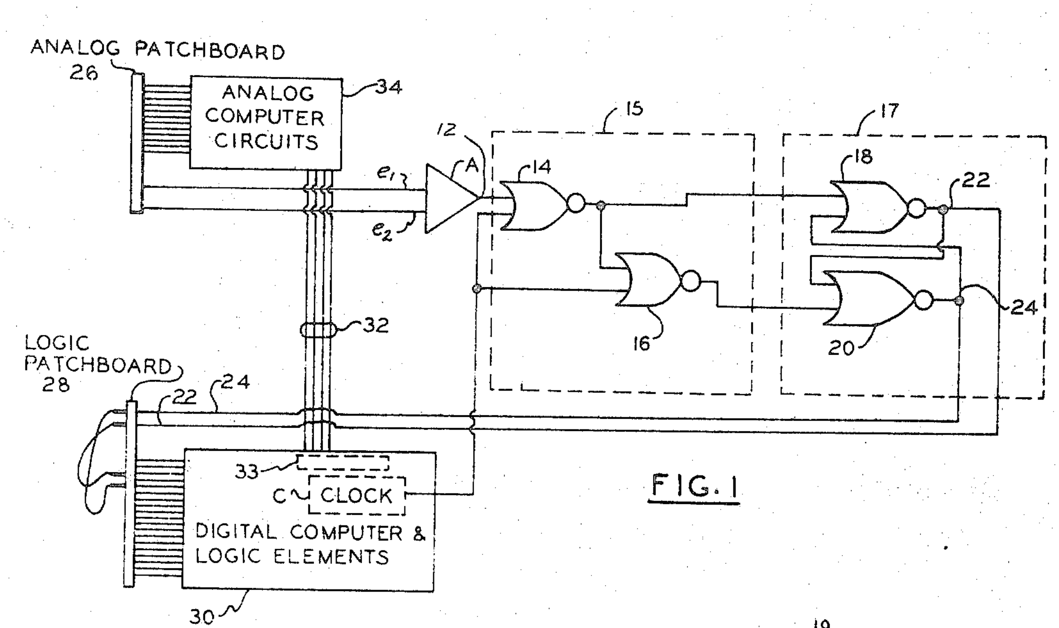
FIG. 1 is an electrical schematic of one illustrative embodiment of the invention.

In FIG. 1 a conventional analog comparator A, which ordinarily will comprise a portion of analog computer apparatus 34, is shown connected to receive analog input signals $e_1$ and $e_2$, which result from computations being performed by various circuits within apparatus 34. The function of comparator A is to provide a Boolean output signal having a value of "0" whenever $e_1+e_2$ is less than zero and a value of "1" when $e_1+e_2$ is greater than zero. In the invention the comparator output signal on line 12 is applied as one input to NOR gate 14, to which the synchronous digital computer clock pulse source C is also connected. The output of NOR gate 14 and the clock pulses are also connected to drive NOR gate 16. The output signals from NOR gates 14 and 16 are connected to respective input lines of a flip-flop shown as comprising a pair of cross-connected NOR gates 18 and 20, to provide a pair of mutually opposite output signals on lines 22 and 24. The output signals on lines 22 and 24 are routed as shown to logic patchboard 28, from where they may be selectively patched to control various digital devices associated with synchronous digital computer 30, and/or to control various analog components (such as switches) within analog computer 34 through control lines (represented by lines 32) extending from the digital computer output signal bus or register 33 to analog computer 34 or extending from logic elements in 30 to analog computer 34. When an analog computer is operated without a digital computer, its comparator output signals ordinarily operate switches immediately, but when the analog computer is interconnected with a digital computer it is obviously desirable in the interests of accuracy, that the operating modes of both computers be synchronized to be changed simultaneously, and hence the analog computer switches controlled by the analog comparator are synchronized with the digital computer clock pulses.

Figures 2, 3, 4:
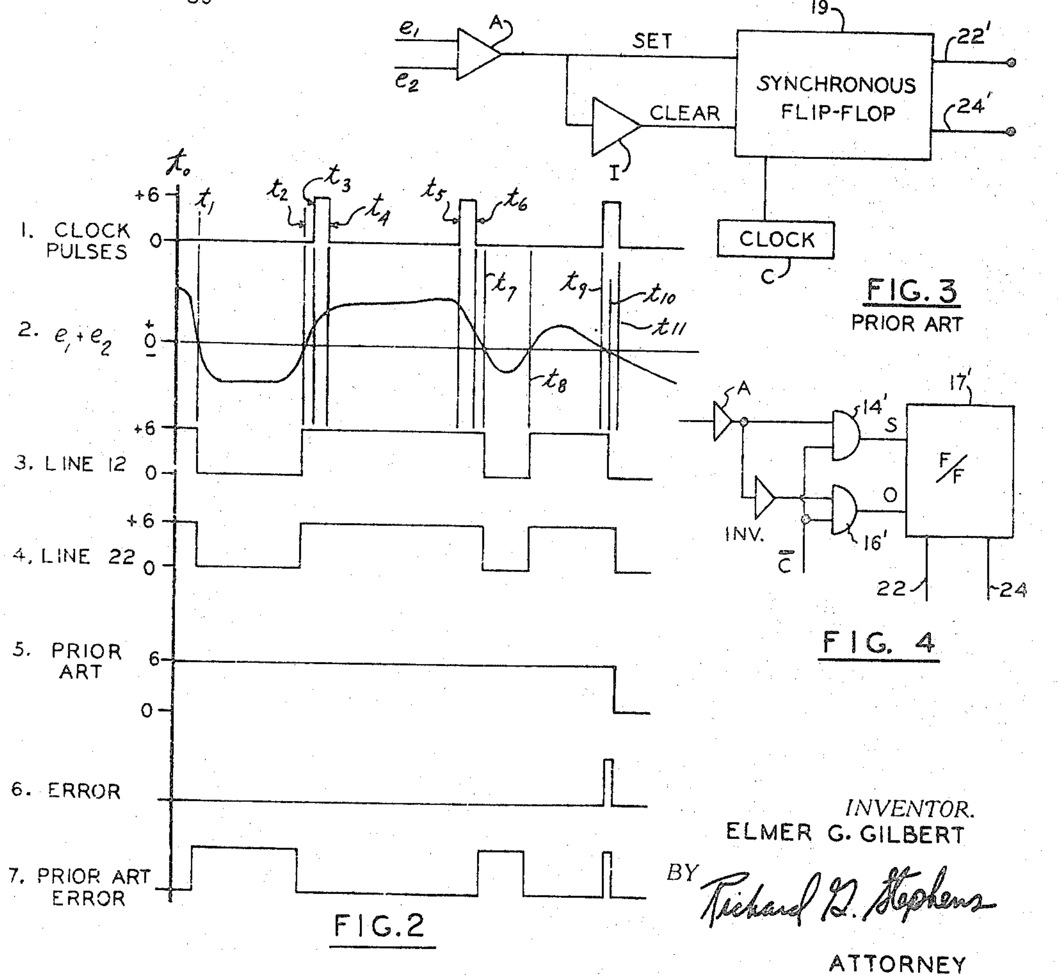
FIG. 2, FIG. 3 PRIOR ART, FIG. 4
FIG. 2 is a collection of waveforms useful in understanding the operation of the invention.
FIG. 3 is a block diagram illustrating the prior art technique.
FIG. 4 illustrates an alternative gating circuit which may be substituted for the NOR gates 14 and 16 of FIG. 1.

The operation of each conventional NOR gate shown in FIG. 1 is to provide an output signal (binary "1") from its output terminal during all times that no input signal (binary "0") is applied to both of its input lines, but to provide a "0" output signal when an input signal (binary "1") is applied to either or both of its input lines. In the waveform diagram of FIG. 2 the presence of a signal (i.e. a binary "1" signal) is indicated as a +6 volt level and the absence of a signal is shown as a zero volt level. In FIG. 2 the sum of the analog inputs ($e_1+e_2$) is shown as positive from time $t_0$ to time $t_1$, and hence the comparator output signal on line 12 is "1" during that time, making the output of gate 14 (low (i.e. binary "0") during that time. The low output from gate 14 and the absence of a clock pulse during that time make the output of NOR gate 16 high (i.e. binary "1"), so that the output of gate 20 is low and the output of gate 18 on line 22 is high. The signal on line 24 is always the inverse of that on line 22, of course. At time $t_1$ the switching of comparator A to provide a low signal on line 12 makes the gate 14 output high, which in turn makes the gate 16 output low, the gate 20 output high and the gate 18 output on line 22 low. As shown in FIG. 2 such conditions continue until time $t_2$ when the comparator switches again, reverting to the same conditions as those which initially prevailed.

At time $t_3$, very shortly after time $t_2$, the leading edge of a clock pulse occurs, the clock pulse extending from $t_3$ to $t_4$. With comparator A already applying a high signal to gate 14 even prior to time $t_3$, the occurrence of the clock pulse at $t_3$ has no effect upon the low output signal from gate 14. With the gate 14 output low and the gate 18 output high, the gate 20 output is low. The clock pulse from source C does drive the gate 16 output low, but the presence of a high signal from gate 18 keeps the gate 20 output low. Hence the occurrence of the clock pulse during the period $t_3$ to $t_4$ has no effect on the output signal on line 22.

It will be apparent that the output signal on line 22 will remain high through another clock pulse period ($t_5$ to $t_6$), but that comparator A will switch at $t_7$ shortly after $t_6$, the trailing edge of the second clock pulse. At time $t_7$ the output on line 22 will go low for the same reasons specified above in connection with the transition at time $t_1$. At time $t_8$ another switching of comparator A will drive the output on line 22 to a high condition, in the same manner as that which occurred at time $t_2$.

At time $t_9$ another clock pulse period begins. With the comparator output on line 12 already high, occurrence of the clock pulse at time $t_9$ has no effect on the output of gate 14, which remains low. With low inputs from both gate 14 and gate 20, the output of gate 18 on line 22 remains high, and receiving a high input from line 22, the output of gate 20 remains low.

At $t_{10}$ the sum of the analog inputs to comparator A are shown changing sign, so that line 12 goes low, but due to the presence of the clock pulse from source C, the output of gate 14 remains low, and the output of line 18 will be seen to remain high, until the end of the clock pulse at $t_{11}$, at which time gate 14 will provide a high output and gate 18 a low output.

FIG. 3 illustrates the interconnections of those portions of the most-common prior art arrangement which differ from the arrangement of the present invention, and corresponding parts are given corresponding designations. In FIG. 3 it will be seen that the comparator output on line 12 is applied directly to the "set" line, and via an inverter stage I to the "clear" line, of a conventional synchronous flip-flop 19, which also receives clock pulses from clock source C of the digital computer. The output lines 22 and 24 of flip-flop 19 are routed to a logic patchboard to control various analog and digital circuits. Synchronous flip-flop 19, which may take a variety of forms, ordinarily switches to change its output signals at the trailing edges of the clock pulses applied to it from the clock source. Waveform #5 in FIG. 2 illustrates the output on line 22' of the prior art arrangement shown in FIG. 3 when the same $e_1$ and $e_2$ inputs are applied to its comparator A'. Being arranged to switch only at clock pulse trailing edges, synchronous flip-flop 19 cannot switch at time $t_1$, the time of the first transition of comparator A, but not until the clock pulse trailing edge at time $t_4$, and hence its output signal on line 22' is actually in error from time $t_1$ to time $t_2$, and only correct by chance between time $t_2$ and $t_4$ due to the comparator outputs changing again at time $t_2$. Similarly, the flip-flop 19 output is in error between time $t_7$ and $t_8$. The comparator output between those times is completely ignored by synchronous flip-flop 19. Flip-flop 19 will ordinarily switch again at $t_{11}$, the trailing edge of the next clock pulse, due to the comparator output transition which occurred at $t_{10}$. If $t_{10}$ occurs quite near the end of the $t_9$–$t_{11}$ clock pulse period, however, it sometimes may happen that flip-flop 19 may not receive a long enough clock pulse to enable it to switch, and then its output will be erroneous for the complete interval until the next clock pulse occurs. The minimum time during which the prior art synchronous flip-flop output will be erroneous with the exemplary comparator input signals of FIG. 2 is shown as waveform #7 in FIG. 2. It will be seen from comparison of waveforms #7 and #6 that the output signals on lines 22 and 24 of the arrangement of the invention are in error for much less time than those on lines 22' and 24' of the prior art arrangement. During the error intervals in either case a large number of switches, for example, may be erroneously closed when they should not be, or conversely may not be closed when they should be, so that computational errors occur in a large number of circuits which are so intricately connected that proper compensation for such errors is so complex as to be impossible. Even where the prior art arrangement does not wholly overlook an event (as exemplified at times $t_1$ to $t_2$ in FIG. 2), considerably more delay or time lag will be seen to occur. Both missed events and time delays will be apparent sources of error, the latter being particularly serious when the comparator output is patched to control both digital computer circuits and analog computer circuits.

In typical contemporary applications the clock pulses shown in FIG. 2 might occur once per microsecond, for example, and have a width of 300 nanoseconds, or in other applications, perhaps as slowly as once per second. A variety of NOR gates may be used to practice the invention, such as type SN 7400 manufactured by Texas Instruments, Inc. For example, it will be readily apparent to those skilled in the art as a result of this disclosure, that equivalent operation may be obtained by implementing standard logic equations describing FIG. 1, or modified forms of these equations, using NAND gates, or using AND gates, inverters and OR gates, in lieu of the NOR gates shown. Various applications may utilize simple diode gates, for example, while others may use transistor gates or various other types of gates.

In its most basic aspects, the circuitry responsive to the comparator A output and the clock pulse may be seen to comprise gating circuitry (shown within dashed lines at 15 in FIG. 1), and both the gating circuitry 15 and bistable device 17 may take a variety of forms. FIG. 4 illustrates an alternative gating circuit which includes inverter INV and two conventional AND gates 14' and 16' connected to drive the set and clear lines respectively, of a conventional flip-flop 17'. When the clock signal $\overline{C}$ is "1" (between clock pulses), the comparator output will be tracked by flip-flop 17', with a "1" output from the comparator setting flip-flop 17' through AND gate 14' and a "0" output from the comparator clearing the flip-flop through AND gate 16'. When the clock pulse $\overline{C}$ is "0," however (during the clock pulse period), both AND gates are closed, and flip-flop 17' remains in the state which it had immediately prior to the clock pulse period. In FIG. 4 the clock pulse period has been defined as that period when the clock pulse is "0" rather than when it is "1" as was the case in FIG. 1.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. In a hybrid analog-digital computer apparatus including an analog comparator responsive to at least a pair of analog signals and operative to provide comparator output logic signals, a synchronous digital computer having a clock pulse source to time the operations within said digital computer, and a patchboard for connecting said comparator logic signals to control portions of said apparatus, the combination of a switching circuit connected to be responsive to said comparator logic signals and to clock pulse signals from said clock pulse source and operative to provide further logic signals to said patchboard, said further logic signals being inhibited by said switching circuit from changing state during the occurrence of said clock pulses and being enabled to change state during the time between successive of said clock pulses.

2. Apparatus according to claim 1 in which said switching circuit comprises a gating circuit responsive to said comparator output logic signals and said clock pulse signals and operative to provide first and second output signals on first and second lines, and a bistable circuit connected to be responsive to said first and second output signals and operative to provide said further logic signals.

3. Apparatus according to claim 2 in which said gating circuit comprises first and second AND gates and an inverter, said first AND gate being responsive to said comparator output logic signals and to said signals from said clock pulse source and operative to provide said first output signals on said first line, said inverter being operative to invert said comparator logic signals, said second AND gate being responsive to said inverted comparator output logic signals from said inverter and to said signals from said clock pulse source and operative to provide said second output signals on said second line.

4. Apparatus according to claim 1 in which said switching circuit comprises: a first gate means connected to receive said comparator logic signals and said clock pulse signals and operative to provide first output signals; a second gate means connected to receive said clock pulse signals and said first output signals and operative to provide second output signals; and a pair of cross-connected third and fourth gate means operative to provide said further logic signals, said third gate means being connected to receive said first output signals and the output signals from said third gate means.

5. Apparatus according to claim 3 in which each of said gate means comprises a NOR gate circuit.

6. A hybrid computation system, comprising, in combination: an electronic analog computer having a plurality of analog computing elements selectively interconnected to provide a portion of a problem solution, said computing elements including an analog comparator responsive to at least a pair of analog signals from others of said analog computing elements and operative to provide comparator output logic signals upon the occurrence of a predetermined value of the sum of said pair of analog signals; a synchronous digital computer programmed to provide another portion of said problem solution and interconnected with said analog computer to transmit data to said analog computer and to receive data from said analog computer, said digital computer having a clock pulse source for providing clock pulse signals at a fixed clock repetition rate to time the operations of said digital computer; a switching circuit responsive to said comparator output logic signals and responsive to said clock pulse signals for providing further logic signals, said further logic signals being inhibited by said switching circuit from changing state during the occurrence of any one of said clock pulses and being enabled to change state during the time between successive ones of said clock pulses; and means for connecting said further logic signals to control the computation procedure of at least one of said computers.

7. A system according to claim 6 in which the time width of each of said clock pulses is less than said time between successive ones of said clock pulses.

8. A system according to claim 6 in which said further logic signals are connected to control the computation procedure of said digital computer.

9. A system according to claim 6 in which said further logic signals are connected to control switches within said analog computer to control the computation procedure of said analog computer.

10. A system according to claim 6 in which the last-stated means comprises selective connection means for connecting said further logic signals to control the computation procedures of both of said computers.

References Cited

UNITED STATES PATENTS

| | | | |
|---|---|---|---|
| Re. 26,082 | 9/1966 | Osborne | 307—215 X |
| 3,034,719 | 5/1962 | Anfenger et al. | 235—150.5 X |
| 3,067,940 | 12/1962 | Preston | 235—150.5 |
| 3,114,109 | 12/1963 | Melas | 307—208 X |
| 3,145,309 | 8/1964 | Bothwell et al. | 307—208 X |
| 3,183,342 | 5/1965 | Wortzman | 235—150.5 X |
| 3,291,973 | 12/1966 | Rasche | 307—215 X |

MALCOLM A. MORRISON, Primary Examiner

J. F. RUGGIERO, Assistant Examiner

U.S. Cl. X.R.

307—208